(12) United States Patent
Bharadhwaj

(10) Patent No.: US 6,845,506 B1
(45) Date of Patent: *Jan. 18, 2005

(54) SYSTEM AND METHOD FOR MULTI-LEVEL MEMORY DOMAIN PROTECTION

(75) Inventor: Rajeev Bharadhwaj, Aurora, CO (US)

(73) Assignee: Fujitsu Limited, Kawasaki (JP)

( * ) Notice: Subject to any disclaimer, the term of this patent is extended or adjusted under 35 U.S.C. 154(b) by 461 days.

This patent is subject to a terminal disclaimer.

(21) Appl. No.: 09/992,736

(22) Filed: Nov. 13, 2001

Related U.S. Application Data

(63) Continuation of application No. 08/834,060, filed on Apr. 11, 1997, now Pat. No. 6,360,244.

(51) Int. Cl.⁷ .............................................. G06F 9/48
(52) U.S. Cl. ..................................... 718/108; 711/163
(58) Field of Search ............................... 718/107, 108; 711/163, 164

(56) References Cited

U.S. PATENT DOCUMENTS

| | | | | |
|---|---|---|---|---|
| 5,157,777 A | * | 10/1992 | Lai et al. | 711/202 |
| 5,210,874 A | * | 5/1993 | Karger | 719/328 |
| 5,280,614 A | | 1/1994 | Munroe et al. | |
| 5,313,638 A | | 5/1994 | Ogle et al. | |
| 5,339,422 A | * | 8/1994 | Brender et al. | 714/4 |
| 5,666,519 A | * | 9/1997 | Hayden | 703/23 |
| 5,845,129 A | | 12/1998 | Wendorf et al. | |
| 6,360,244 B1 | * | 3/2002 | Bharadhwaj | 718/108 |

FOREIGN PATENT DOCUMENTS

EP        0 480 546 A2      4/1992

OTHER PUBLICATIONS

Ozaki, Brenda et al. "Software Fault Tolerance in Architectures with Hierarchical Protection Levels." IEEE. 1988.*
"Memory Protection Software Facility for OS/2 Shared Data Applications," IBM Technical Disclosure Bulletin, Sep. 1991, pp. 81–89, vol. 34, No. 4A.
H.M. Deitel, et al. "The Design of OS/2," Dec. 30, 1992, pp. 2.3.3, 2.3.11, Addison–Wesley Publishing Co.
M.S. Kogan, et al. "The Design of Operating System/2," IBM Systems Journal, Jan. 1988, pp. 90–104, vol. 27, No. 2.

* cited by examiner

Primary Examiner—Lewis A. Bullock, Jr.
(74) Attorney, Agent, or Firm—Carr & Ferrell LLP

(57) ABSTRACT

A system and method for multi-level memory domain protection. A user process for executing operating system code at a first protection level and user code at a second protection level. A domain process for executing the operating system code at the first protection level and domain code at the second protection level. The operating system code protecting the domain code, executing at the second protection level, from the user code, executing at the second protection level, by context switching between the user process context and the domain process context.

11 Claims, 18 Drawing Sheets

SYSTEM AND METHOD FOR MULTI-LEVEL MEMORY DOMAIN PROTECTION

This application is a continuation of U.S. Application Ser. No. 08/834,060 filed on Apr. 11, 1997, now U.S. Pat. No. 6,360,244 issued on Mar. 19, 2002, and claims priority therefrom pursuant to 35 U.S.C. §120.

BACKGROUND OF THE INVENTION

1. Field of the Invention

The present invention relates generally to systems and methods for implementing multi-level protection of memory domains, and more particularly to implementing N levels of memory domain protection on hardware that only supports two levels of memory domain protection.

2. Discussion of Background Art

Memory domain protections are a necessary part of any computer architecture. Traditionally, computer architectures have illustrated protection of memory domains with a set of concentric circles, i.e. memory domain rings, centered around an operating system. The operating system controls access to a computer's peripheral devices, internal memory, and processing unit. The operating system controls the most trusted memory domain within a computer. Moving from the operating system outward, each memory domain ring represents a memory domain which is a less trusted than the memory domain which it encloses. Finally, at the outer periphery of the memory domain rings is a memory domain containing user code. User code consists of any number of application programs that a user typically interacts with directly via a keyboard or some input device. User code represents the least trusted memory domain within the computer.

Typically, a large portion of the operating system is written to protect the computer from blindly executing programming instructions contained in the less trusted memory domains. These protections however, not only increase the size of the operating system code but also severely slow down the computer's operation regardless of the level of trust from which the programming instructions originated.

The memory domain ring concept recognizes the fact that some code is more trusted and thus need not be subject to rigorous operational checks by the operating system. As a result, computer architectures implemented with memory domain rings may operate faster since more trusted code is spared protective computer checks before the computer is commanded to perform various operations.

The current memory domain ring concept, however, does not support cases where co-dependent applications are equally trusted, and thus the operating system would still perform its rigorous checks that the co-dependent applications communicated with each other, even though such checks would be unnecessary.

Additionally, only hardware implementations of the memory domain concept exist. Thus, to achieve three levels of memory domain protection, the computer's hardware must be set up specifically for three levels of protection. And, to achieve ten levels of memory domain protection, the computer's hardware must be set up specifically for ten levels of protection. Due to the expense and complexity of implementing such specific multilevel protection in hardware, only the most expensive or specialized of computers support more than two levels of protection. The two levels support a most trusted memory domain for the operating system and a less trusted memory domain for user application programs.

Today, with the increasing complexity of computer system operation and the tendency toward developing specialized software that is much more trusted than a typical user application, there is a need for a computer supporting multiple levels of memory domain protections without increasing the computer's hardware complexity.

More specifically, what is needed is a better system and method for implementing N levels of memory domain protection.

SUMMARY OF THE INVENTION

The present invention is system and method for multi-level memory domain protection. The present invention enables the three levels of memory domain protection to be achieved on computer hardware that supports only two levels of protection. These three levels are created by first, defining a domain process, including an operating system, domain code and data, and user code and data. Next, a user process having the operating system, a reserved portion, and the in user code and data is defined. While the operating system is protected from the domain code and data by normal two level hardware protections, the reserved portion is a software construct which is created to protect the domain code from the user code. By defining a reserved portion within the user process, a third level of protection is created in hardware that supported only two levels of memory domain protection. The three memory domain levels are an operating system lip level, a domain level, and a user level. The operating system executes a context switch between the user process and the domain process at the request of either the user code or the domain code. These requests are executed by the operating system code using a handshake procedure. Any number of levels of memory domain protection may be implemented simply by creating additional domain processes and performing additional context switches.

Within the system of the present invention, a user process executes user code that accesses user data and executes user-to-domain control transfer instructions. A domain process executes domain code that accesses domain data or user data and executes domain-to-user control transfer instructions or domain-to-user data access instructions. The user code or the domain code that contains either the control transfer instructions or the data access instructions is called the calling-code. The user code or the domain code that the control transfer instructions or the data access instructions are transferring control to or accessing data from is called the target. The user-to-domain control transfer instructions and the domain-to-user control transfer instructions are maintained in call gates.

Call gates implement the mechanism for transferring control from one protection level to another in the multiple level memory domain protections architecture. A user call gate implements a control transfer from the user level to the domain level. A domain call gate initiates a control transfer from the domain level to the user level. Data transfers, required by data access instructions, do not require call gates.

A user call gate and a domain call gate are respectively added to the user code and the domain code. A call gate may call the operating system via a system call to effect a level change. The operating system causes the level change by doing a context switch. A user-to-domain call gate will cause a context switch between a user process and a domain process. A domain-to user call gate will cause a context switch between a domain process and a user process.

The circuit of the present invention is particularly advantageous over the prior art because it enables any number of memory domain protection levels to be implemented on hardware that only supports two levels of memory domain protection.

These and other aspects of the invention will be recognized by those skilled in the art upon review of the detailed description, drawings, and claims set forth below.

DETAILED DESCRIPTION OF THE PREFERRED EMBODIMENT

The present invention is designed as a set of computer-readable program instructions which controls how a processing unit within a computer (not shown) accesses, transforms and outputs data. The computer includes various well known devices for storing and executing the computer-readable program instructions. Those skilled in the art will recognize that the computer-readable program instructions could be stored and accessed from within various computer useable storage media, including a compact disk, a magnetic disk or a memory chip. How the computer-readable program instructions effect the present invention is discussed in detail below.

Figure 1:
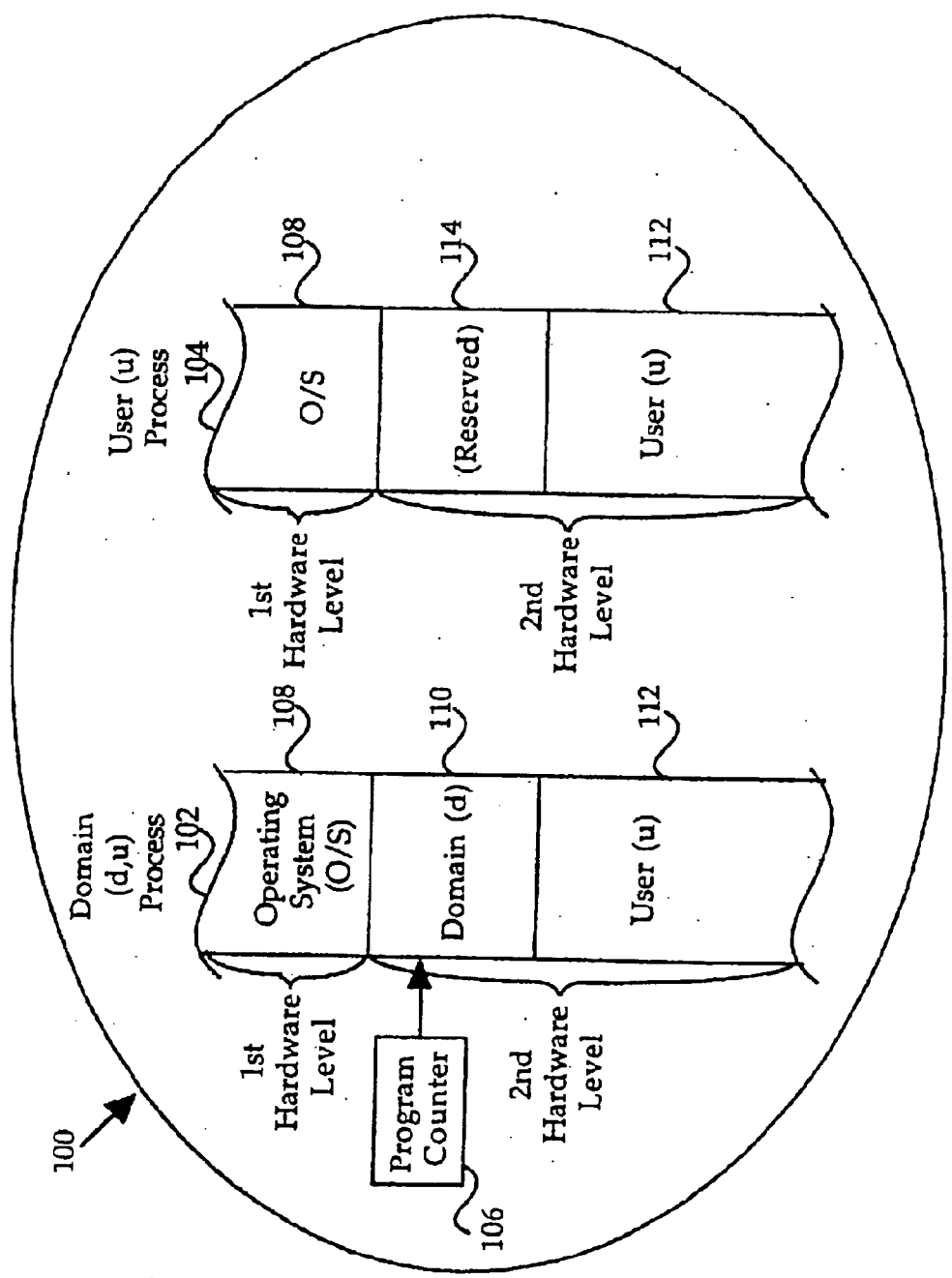
FIG. 1 is a process group for implementing three levels of memory domain protection.

FIG. 1 is a process group 100 for implementing three levels of memory domain protection on hardware that supports only two levels of protection (i.e. a first hardware level and a second hardware level). The process group 100 is located in a computer's virtual address space (not shown) and includes a domain (d,u) process 102, and a user (u) process 104 of which only one can be operational at a given time. The variables d and u are used to refer to a specific domain code and a specific user code within the process group 100. Additionally, in virtual addressed cache architectures that support address space tags (ASTAGs), one ASTAG is preferably allocated to the domain process 102, and one to the user process 104. A program counter 106 is located within the computer's processing unit (not shown) and points to a next instruction to fetch from the virtual address space. Program control within the computer is transferred by repositioning the program counter 106.

The domain process 102 includes an operating system 108, a domain (d) code 4 and data 110, and a user (u) code and data 112. The user process 104 includes the operating system 108, a reserved area 114, and the user code and data 112. Each of the aforementioned processes 102, 104 and codes 108, 110, 112 are mapped into the virtual address space of the computer. Exemplary operating system codes 108 include, Windows NT and UNIX. Exemplary domain codes 110 include, web server codes, firewall codes, and data base server codes. Exemplary user codes 112 include, word-processing codes, spreadsheet codes, and internet browsing codes. Domain (1) code 110, may be used to refer to a web server code, domain (2) code 110, may be used to refer to a firewall code, user (1) code 112 may be used to refer to a word-processing code, and so on.

The operating system 108 and the user code and data 112 are the same in both processes 102 and 104 since each process 102, 104 merely represents a different context for viewing the same areas of computer memory. The operating system 108 controls which process 102 or 104 is recognized at a given time by context switching between the two processes 102, 104. While in the domain process 102 context, the domain code 110 is executing and has visibility into the user code and data 112. However, while in the user process 104 context, the user code 112 is executing and does not have visibility into the domain code and data 110, which the user code 112 only sees as a reserved area 114. Since the area 114 is perceived as reserved by the user code 112, the domain code and data 110 residing in the reserved area 114 is protected from the user code 112. Protection is defined as a computer protocol that permits code in an inner domain ring (i.e. a more trusted code) an ability to read data from, write data to, or execute code within a memory domain at an outer domain ring (i.e. a less trusted code), but restricts the code in the outer domain ring to only executing the code within the memory domain of the inner domain ring.

The present invention enables the three levels of memory domain protection to be achieved on hardware that supports only two levels of protection by first creating the domain process 102 context and the user process 104 context. When the domain code 110 is executing, the program counter 106 must be in the domain process 102 context. Within the domain process 102 context, the operating system 108 is protected from the domain code 110 by normal two level hardware protections. When the user code 112 is executing, the operating system 108 must place the program counter 106 in the user process 104 context. Within the user process 104 context, the operating system 108 is protected from the user code 112 by normal two level hardware protections, and the domain code and data 110 is protected from the user code 112 by the reserved area 114. The reserved area 114 is a software construct which conceals the domain code and data 110 from the user code 112, thus creating a third level of protection in hardware that supports only two levels of memory domain protection. The three resultant levels of memory domain protection are: an operating system level, a domain code level, and a user code level.

Control transfer and data access by the user code 112 (at one level) and the domain code 110 (at another level) are achieved using a process of context switching, to be discussed in detail below. In some cases, the control transfer or the data access requires that the operating system 108 context switch between the user process 104 and the domain process 102, in what is called an intra-group context switch. In other cases, the control transfer or the data access requires that the operating system 108 context switch between a first process group (such as process group 100 where d=1 and u=1) and a second process group (such as process group 100 where d=1 and u=2), in what is defined as an inter-group context switch. Those skilled in the art will recognize how to program both the intra-group context switch and the inter-group context switch.

Figure 2:
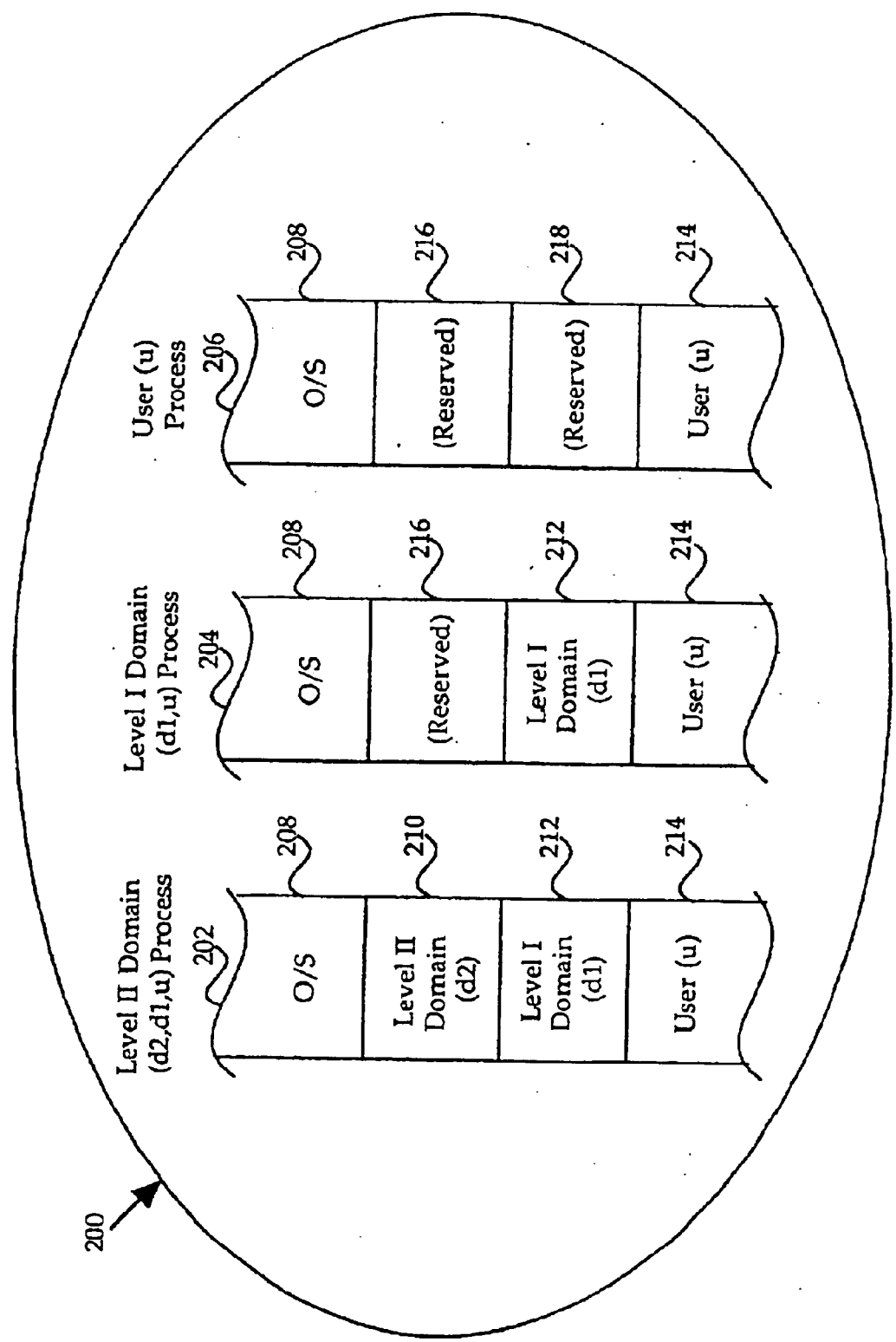
FIG. 2 is a process group for implementing four levels of memory domain protection.
Figure 3:
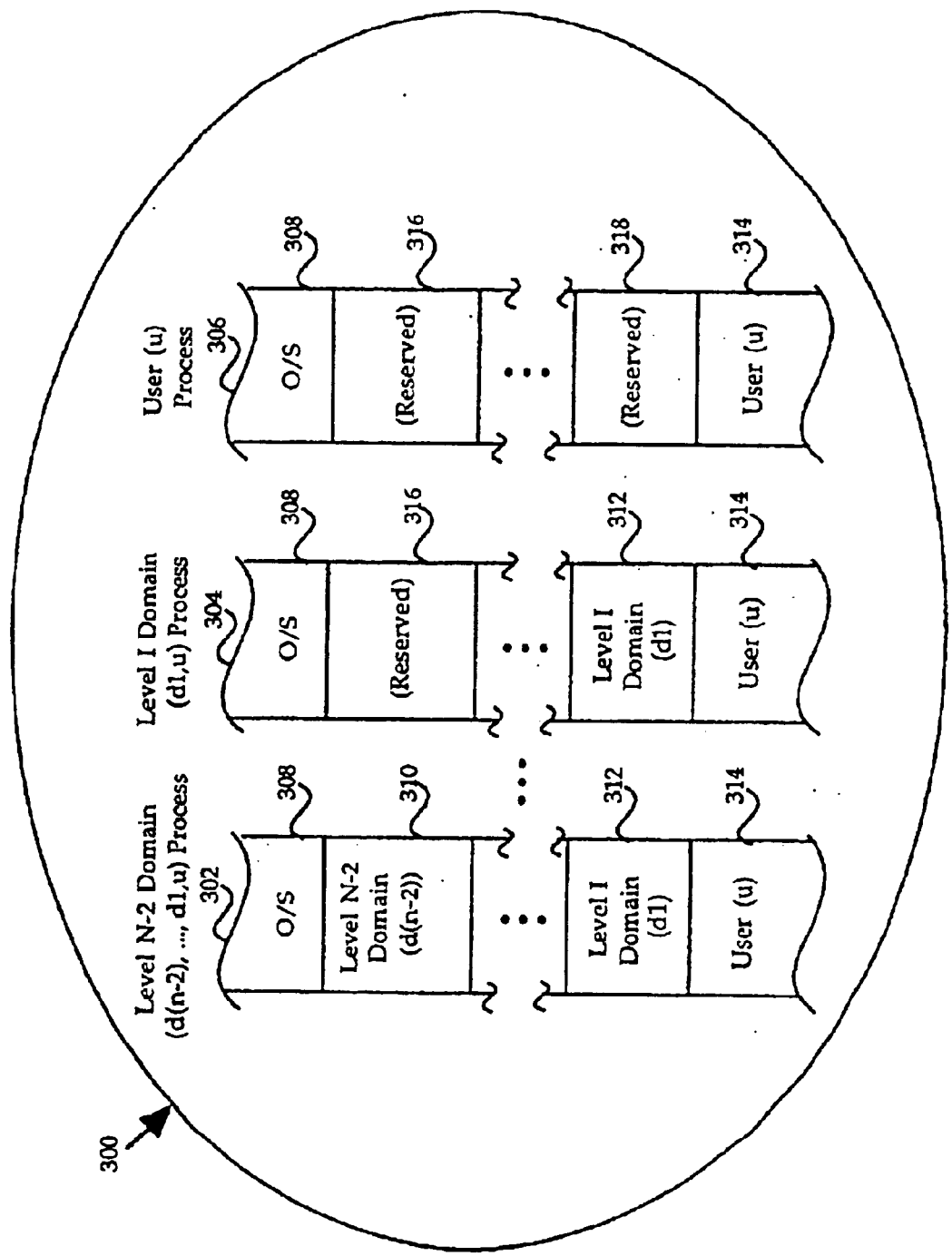
FIG. 3 is a process group for implementing N levels of memory domain protection.

Any number of levels of memory domain protection may be implemented simply by creating additional domain processes and performing additional context switches, as will be shown with respect to FIGS. 2 and 3.

In the present invention, three levels of protection are implemented using a protocol which:

1) permits the operating system 108 to read data from, write data to, or execute code anywhere within any domain 110 or user 112;
2) permits the domain code 110 to execute code within (using a system call), but not to read data from or write data to the operating system 108;
3) permits the domain code 110 to read data from, write data to, or execute code anywhere within either a domain at the same protection level, or any user;
4) permits the user code 112 to execute code within (using a system call), but not to read data from or write data to the operating system 108 and the domain 110; and
5) restricts the user code 112 from reading data from, writing data to, or executing code within any other user.

FIG. 2 is a process group 200 for implementing four levels of memory domain protection on hardware that supports only two levels of protection (i.e. a first hardware level and a second hardware level). The process group 200 is located in a computer's virtual address space (not shown) and includes a level II domain ($d_2,d_1,u$) process 202, a level I domain ($d_1,u$) process 204, and a user (u) process 206 of which only one can be operational at a given time. The variables $d_2$, $d_1$, and u are used to refer to specific domain codes and a specific user code within the process group 200.

The level II domain process 202 includes operating system 208, level II domain ($d_2$) code and data 210, level I domain ($d_1$) code and data 212, and user (u) code and data 214. The level I domain process 204 includes operating system 208, a first reserved area 216, level I domain ($d_1$) code and data 212, and user (u) code and data 214. The user (u) process 206 includes operating system 208, the first reserved area 216, a second reserved area 218, and user (u) code and data 214.

The operating system 208 and the user 214 are the same in all processes 202, 204 and 206 since each process 202, 204 and 206 merely represents a different context for viewing the same areas of computer memory. The operating system 208 controls which process 202, 204 or 206 is recognized at a given time by context switching between the processes 202, 204 and 206. The computer system's hardware places the operating system 208 at a first level of protection.

While in the level II domain process 202 context, the level II domain code 210 is executing and has visibility into the level I domain code and data 212 and the user code and data 214. The level II domain process 202 context enables the level II domain code and data 210 to be at a second level of protection.

While in the level I domain process 204 context, the level I domain code 212 is executing and does not have visibility into the level II domain code and data 210, which the level I domain code 212 only sees as the first reserved area 216. Since the area 216 is perceived as reserved by the level I domain code 212, the level II domain code and data 210 residing in the first reserved area 216, it is protected 18 from the level I domain code 212. Thus, the level I domain process 204 context enables the level I domain code and data 212 to be at a third level of protection.

Similarly, while the user process 206 context, the user code 214 is executing and does not have visibility into either the level II domain code and data 210 or the level I domain code and data 212, which the user code 214 respectively only sees as the first reserved area 216 and the second reserved area 218. Since these areas 216 and 218 are perceived as reserved by the user code 214, the level II domain code and data 210 residing in the first reserved area 216 and the level I domain code and data 212 residing in the second reserved area 218 are protected from the user code 214. The user process 206 context thus enables the user code and data 214 to operate at a fourth level of protection.

The four levels of protection are implemented using a protocol which:

1) permits the operating system 208 to read data from, write data to, or execute code anywhere within any level 11 domain 210, level I domain 212, or user 214;
2) permits the level II domain code 210 to execute code within (using a system call), but not to read data from or write data to the operating system 208;
3) permits the level II domain code 210 to read data from, write data to, or execute code anywhere within any level II domain 210, level I domain 212 or user 214;
4) permits the level I domain code 212 to execute code within (using a system call), but not to read data from or write data to either the operating system 208 or the level II domain 210;
5) permits the level I domain code 212 to read data from, write data to, or execute code anywhere within any level I domain 212 or user 214;
6) permits the user code 214 to execute code within (using a system call), but not to read data from or write data to either the operating system 208, the level II domain 210, or the level I domain 212; and
7) restricts the user code 214 from reading data from, writing data to, or executing code within any other user 214.

All of the other discussion relating to the process group 100 apply, after being appropriately scaled, to the process group 200.

FIG. 3 is a process group 300 for implementing N levels of memory domain protection, where N is any integer number. The process group 300 is located in a computer's virtual address space (not shown) and includes a level N-2 domain ($d_{(n-2)}, \ldots, d_1, u$) process 302, various intermediate level domain processes (represented throughout by the symbol . . . ), a level I domain ($d_1$,u) process 304, and a user (u) process 306. The level N-2 domain process 302 includes operating system 308, level N-2 domain ($d_{(n-2)}$) code and data 310, various intermediate level domain processes, level I domain ($d_1$) code and data 312, and user (u) code and data 314. The level I domain process 304 includes the operating system 308, an (n-2)th reserved area 316, various intermediate level reserved areas, the level I domain ($d_1$) code and data 312, and the user (u) code and data 314. The user (u) process 306 includes the operating system 308, the (n-2)th reserved area 316, the various intermediate level reserved areas, a first reserved area 318, and the user (u) code and data 314.

All of the other discussion relating to the process group 200 applies, after being appropriately scaled, to the process group 300.

In the discussion that follows, only implementation of the process group 100 is discussed. After studying the information contained within this specification, those skilled in the art will recognize how to build and implement process groups having N-levels of protection.

Figure 4:
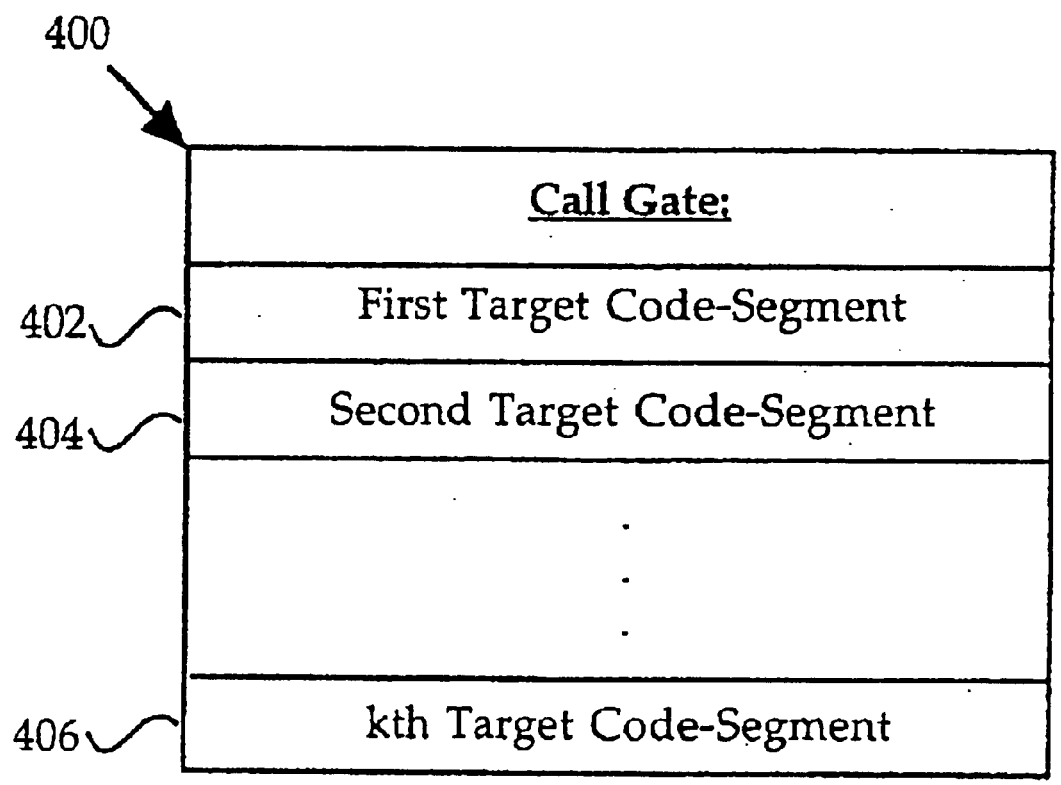
FIG. 4 is a block diagram of a call gate memory map.

FIG. 4 is a block diagram of a call gate memory map 400. The call gate 400 provides a mechanism for both the domain code 110 in the domain process 102 and the user code 112 in the user process 104 to access either the operating system 108, the domain code and data 110, or the user code and data 112. One call gate 400 is created for each set of calling-code 110 or 112 and each target 110 or 112. The calling-code is defined as either the user code 112 or the domain code 110 that initiates a request to access another set of code and data 110 or 112. The target is defined as either the user code and data 112 or the domain code and data 110 that is accessed by the calling-code 110 or 112.

The call gate 400 includes data fields containing a first target code-segment 402, a second target code-segment 404, and a kth target code-segment 406. Each target code-segment 402, 404, 406 corresponds to a unique control transfer link between a particular set of calling-code and a particular target. Each of the target code-segments 402, 404, and 406 are initialized by the operating system 108 at the request of the calling-code. In response to such a request, the operating system 108 creates two target code-segments. The first target code-segment is inserted in the calling-code's call gate 400 and specifies operations for linking the calling-code to the target. The second target code-segment is inserted in the target's call gate 400 and specifies operations for returning from the target to the calling-code. For instance, if domain code 110 has a control transfer link to user code and data 112, then domain code 110 will have within its call gate 400 a target code-segment for accessing the user code and data 112, and user code 112 will have within its call gate 400 a target code-segment for returning back to the domain code 110.

Figure 5:
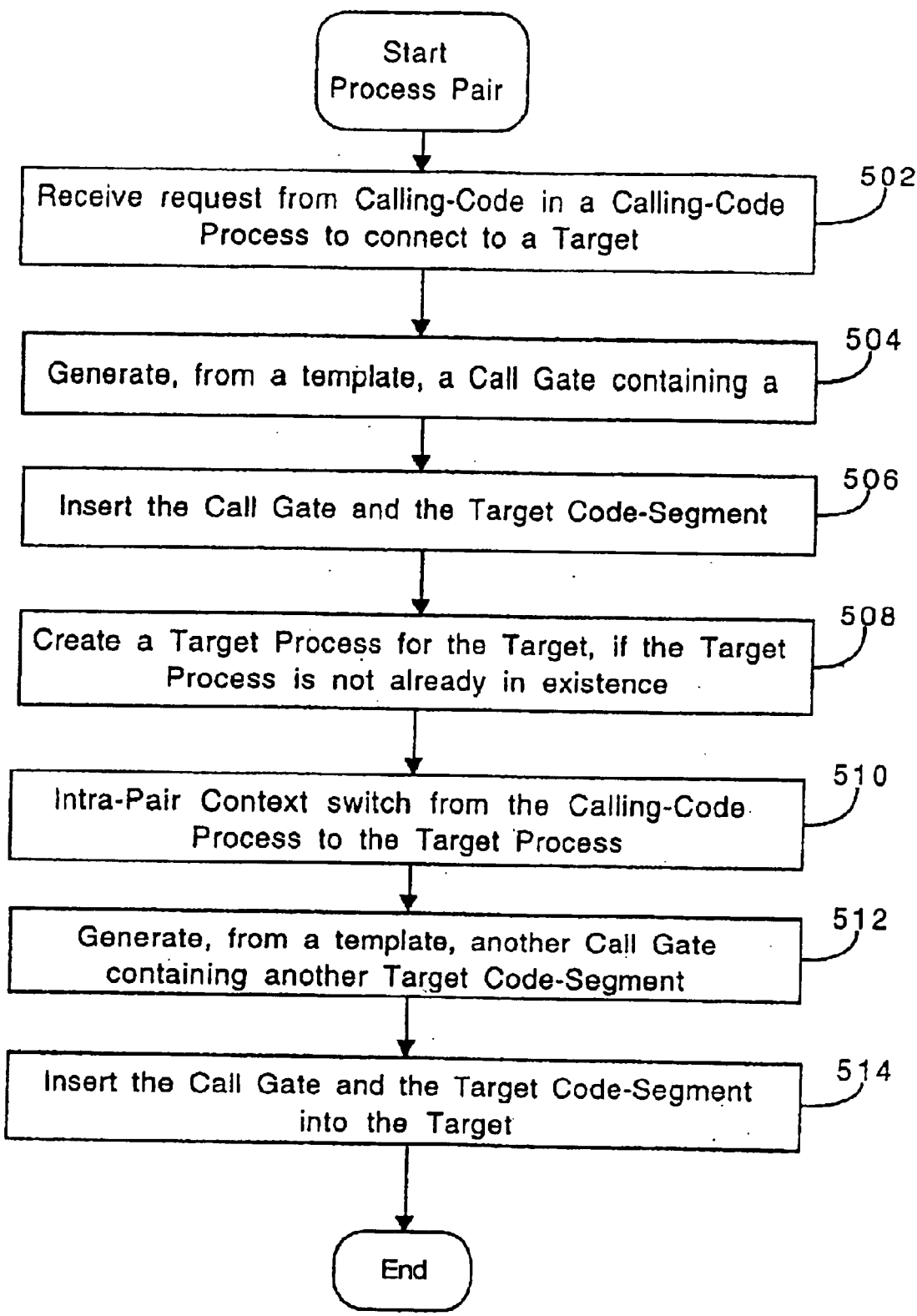
FIG. 5 is a flowchart for initializing a process group.

FIG. 5 is a flowchart for initializing a process group 100. The method begins in step 502 where the operating system 108 receives a request from calling-code in a calling-code process to connect to a target. Next, in step 504, the operating system 108 generates, from a template, a call gate 400 containing a target code-segment 402, 404, 406. In step 506, the operating system 108 adds it to the call gate 400 and the target code-segment 402, 404, 406 into the calling-code. The operating system 108 creates a target process for the target, if the target process is not already in existence, in step 508. Next in step 510, the operating system 108 performs an intra-group context switch from the calling-code process to the target process. In step 512, the operating system 108 generates another call gate 400 containing another target code-segment 402, 404, 406 from a template. The operating system 108 inserts the call gate and the target code-segment into the target in step 514. After step 514, the process of initializing the process group 100 is complete.

Figure 6:
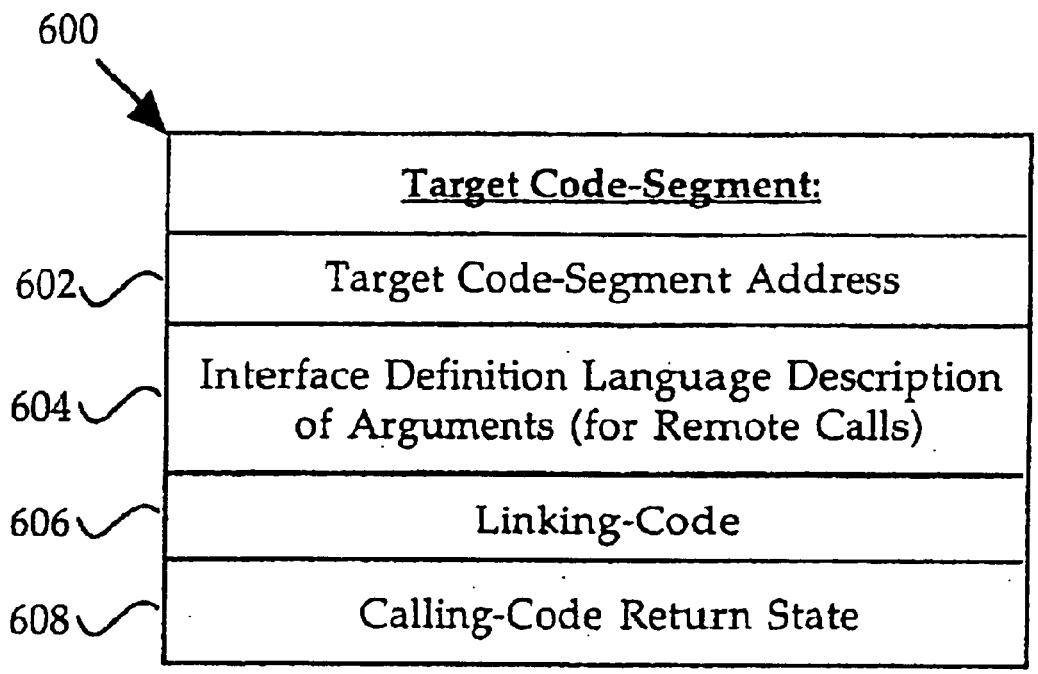
FIG. 6 is a memory map of a target code-segment within the call gate.

FIG. 6 is a memory map of a target code-segment 600 within the call gate 400. The target code-segment 600 includes data fields containing a target code-segment address 602, an Interface Definition Language (IDL) description of arguments 604, linking-code 606, and a calling-code return state 608. The target code-segment address 602 corresponds to an address where the target is first accessed by the calling-code. The IDL description of arguments 604 is used when the calling-code must access the target over a network. This is called a remote call. In contrast, local calls, where both the calling-code and the target are on the same computer, do not use the IDL description of arguments 604. The IDL description of arguments 604 identifies a data type, such as integer, real number, text, etc., for any arguments (see FIG. 7) that the calling-code passes to the target. The linking-code 606 is executed by the calling-code, and transfers control to the operating system 105 to perform either an intra-group or inter-group context switch. The linking-code 606 then resumes control and accesses either the code or data at the target code-segment address 602. The calling-code return state 608 contains information on how to restore the calling-code's configuration after the target gives up control of the program counter 106, but before the calling-code obtains program counter 106 control. The calling-code return state 608 is executed by the operating system 108.

Figure 7:
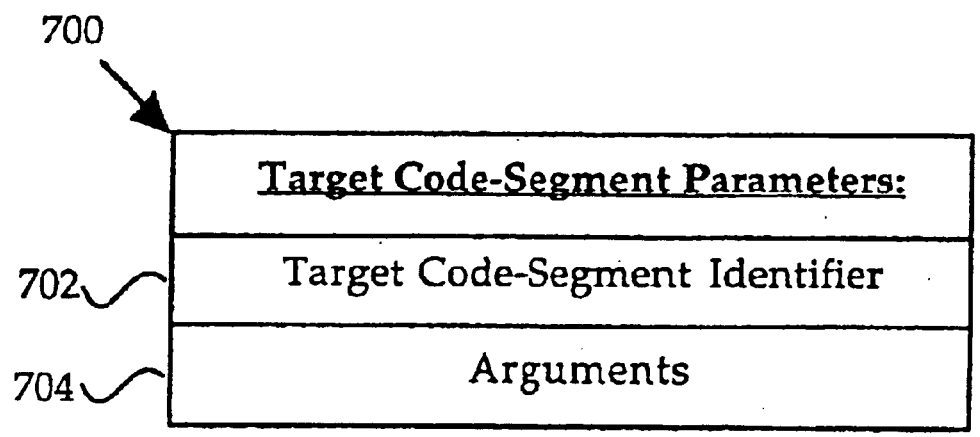
FIG. 7 is a memory map of target code-segment parameters passed to the target code-segment.

FIG. 7 is a memory map of target code-segment parameters 700 passed to the target linking code 606. The target code-segment parameters 700 are generated by and passed from the calling-code to the call gate 400 when a gate call to the linking code 606, in a selected target code-segment 600, is requested by the calling-code. The target code-segment parameters 700 include data fields containing a target code-segment identifier 702 and a set of arguments 704. The target code-segment identifier 702 identifies which target code-segment 402, 404, or 406 that the calling-code is to access. The arguments 704 consist of any information that the calling-code passes to the target so that the target will have the information needed to complete any operation that the calling-code requested of the target.

Figure 8:
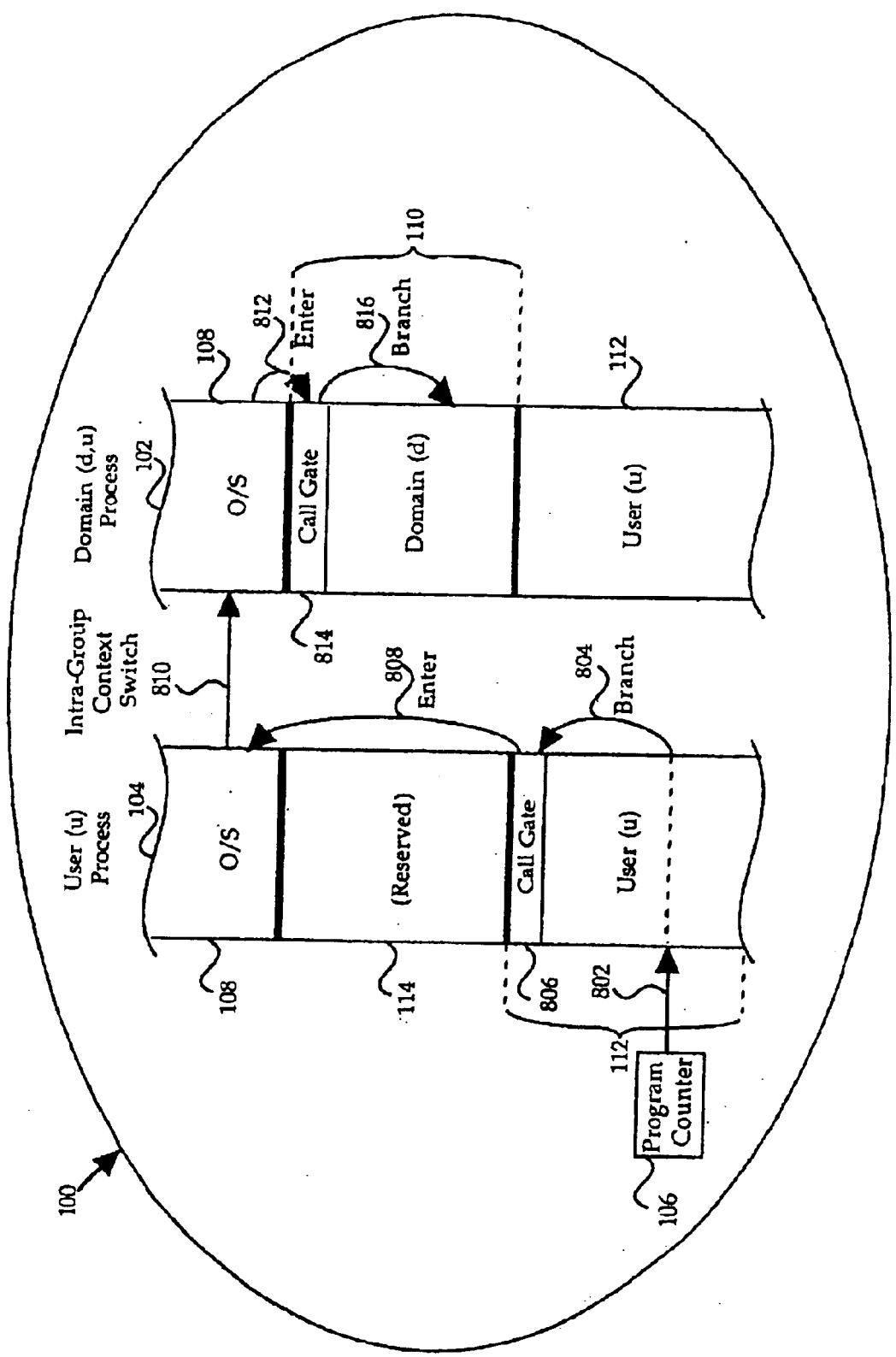
FIG. 8 is a program flow diagram for a user process to domain process control transfer.
Figure 9:
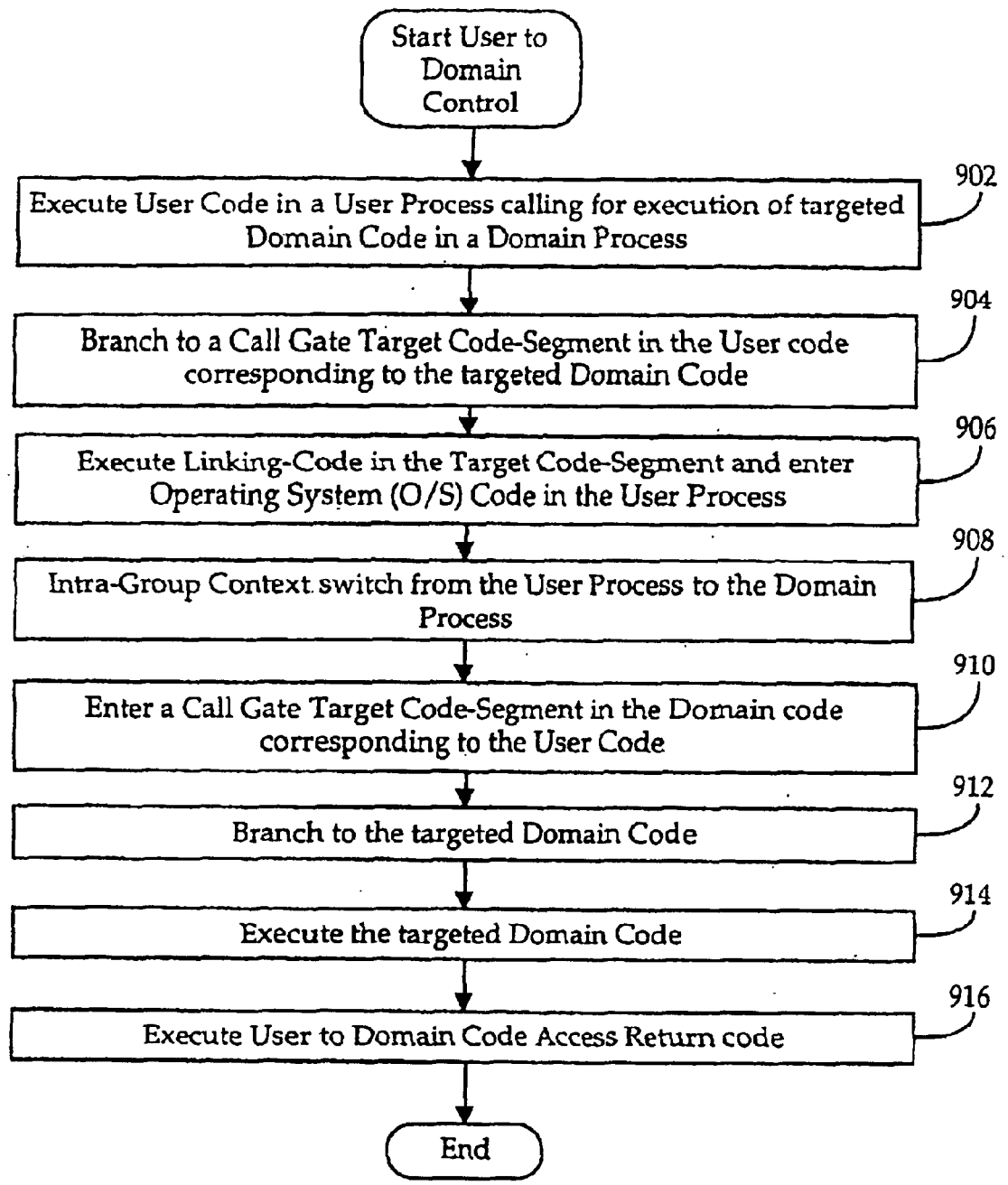
FIG. 9 is a flowchart for the program flow diagram of FIG. 8.

FIG. 8 is a program flow diagram for a user process 104 to domain process 102 control transfer within process group 100. FIG. 9 is a flowchart for the program flow diagram of FIG. 8. FIGS. 8 and 9 are two different representations of the same process and so will be discussed simultaneously. The user-to-domain control transfer begins in step 902, when the program counter 106 references an instruction, as shown by line 802, in the user code 112 within a user process 104, calling for execution of targeted domain code 110 within a domain process 102. In this control transfer, the user code 112 is the calling-code and the domain code 110 is the target. Next in step 904, the calling user code 112 identifies a set of arguments 704 and a target code-segment identifier 702 before causing program control to branch, as shown by line 804, from the user code 112 to a call gate 806 target code-segment, specified by the target code-segment identifier 702. The call gate 806 resides within the user code 112. In step 906, the linking-code 606 in the target code-segment is executed and program control is transferred to, as shown by line 808, the operating system 108 in the user process 104. The linking-code 606 instructs the operating system 108 to both route program control to the code specified by the target code-segment identifier 702 and to pass the arguments 704 to the target. The operating system 108 then performs an intra-group context switch, as shown by line 810, from the user process 104 to the domain process 102 in step 908. If the intra-group context switch, as shown by line 810, required a connection across a network (not shown) the IDL description of arguments 604 would also have been passed to the operating system 108 in the domain process 102. In step 910, program control is transferred to, as shown by line 812, a call gate 814 target code-segment corresponding to the user code 112. The call gate 814 resides within the domain code 110. Next in step 912, the linking-code 606 in the call gate 814 causes program control to branch, as shown by line 816, to the targeted domain code 110. Alternatively, program control may have directly entered the targeted domain code since the operating system 108 has direct access privileges to all domain and user code. After step 912, the domain code 110 then executes the targeted domain code in step 914. Next in step 916 after the domain code 110 has finished executing, the linking-code 606 in the call gate 814 executes a user-to-domain control transfer return. The user-to-domain control transfer return is further described with respect to FIGS. 10 and 11. After step 916, the user-to-domain control transfer is complete.

Since the domain and operating system codes may service more than one user, use of the call gates 806, 814 prevent the user code from anonymously accessing the domain code or the operating system code. The call gates 806, 814 also inform the operating system and domain code to which user process to return to after executing the user's control transfer. Also, each user code 112 preferably can only access domain code in the currently active process group 100. For example, user (u) code 112 may only access domain (d) code 110, if the user (u) code is within the process group where domain (d) code is currently active. User (u) code 112 may not access domain (d+1) code, unless the user (u) code is within a process group where domain (d+1) code currently active.

Figure 10:
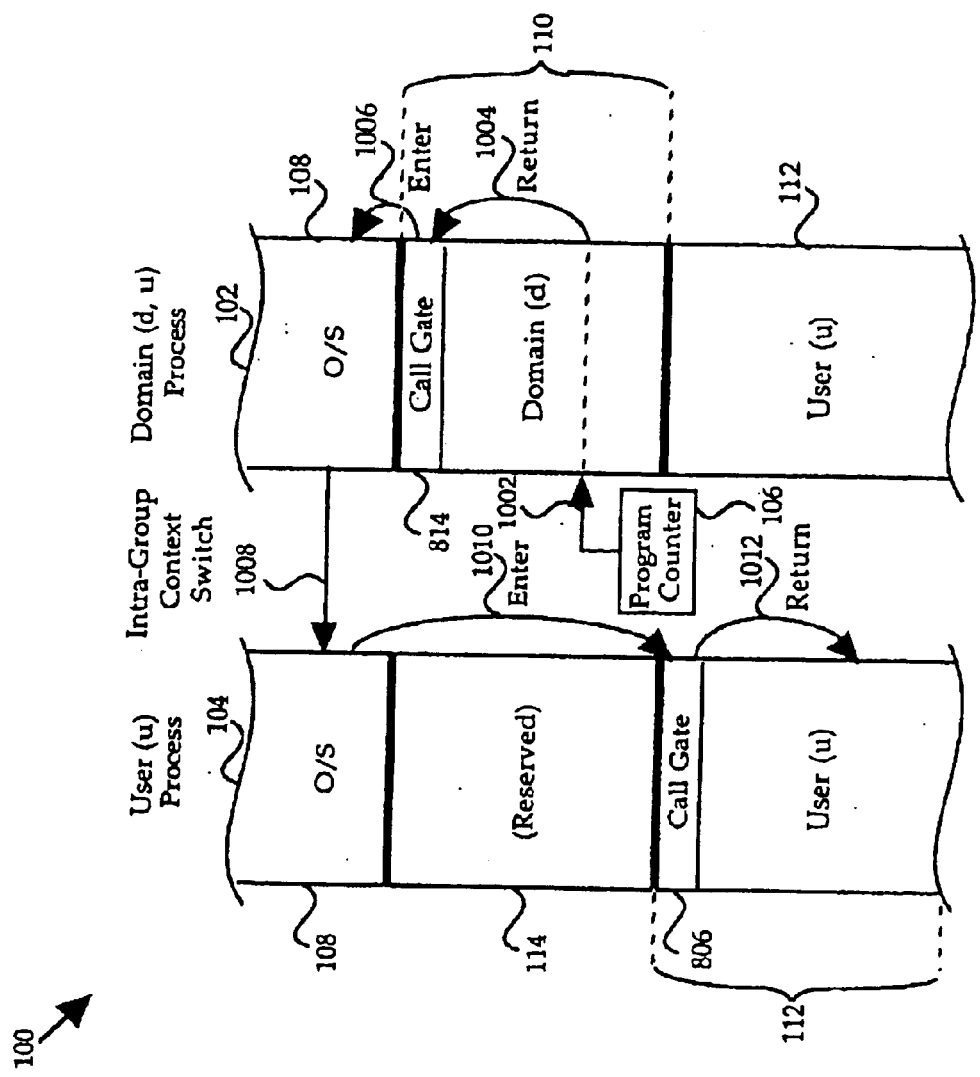
FIG. 10 is a program flow diagram for a user process to domain process control transfer return.
Figure 11:
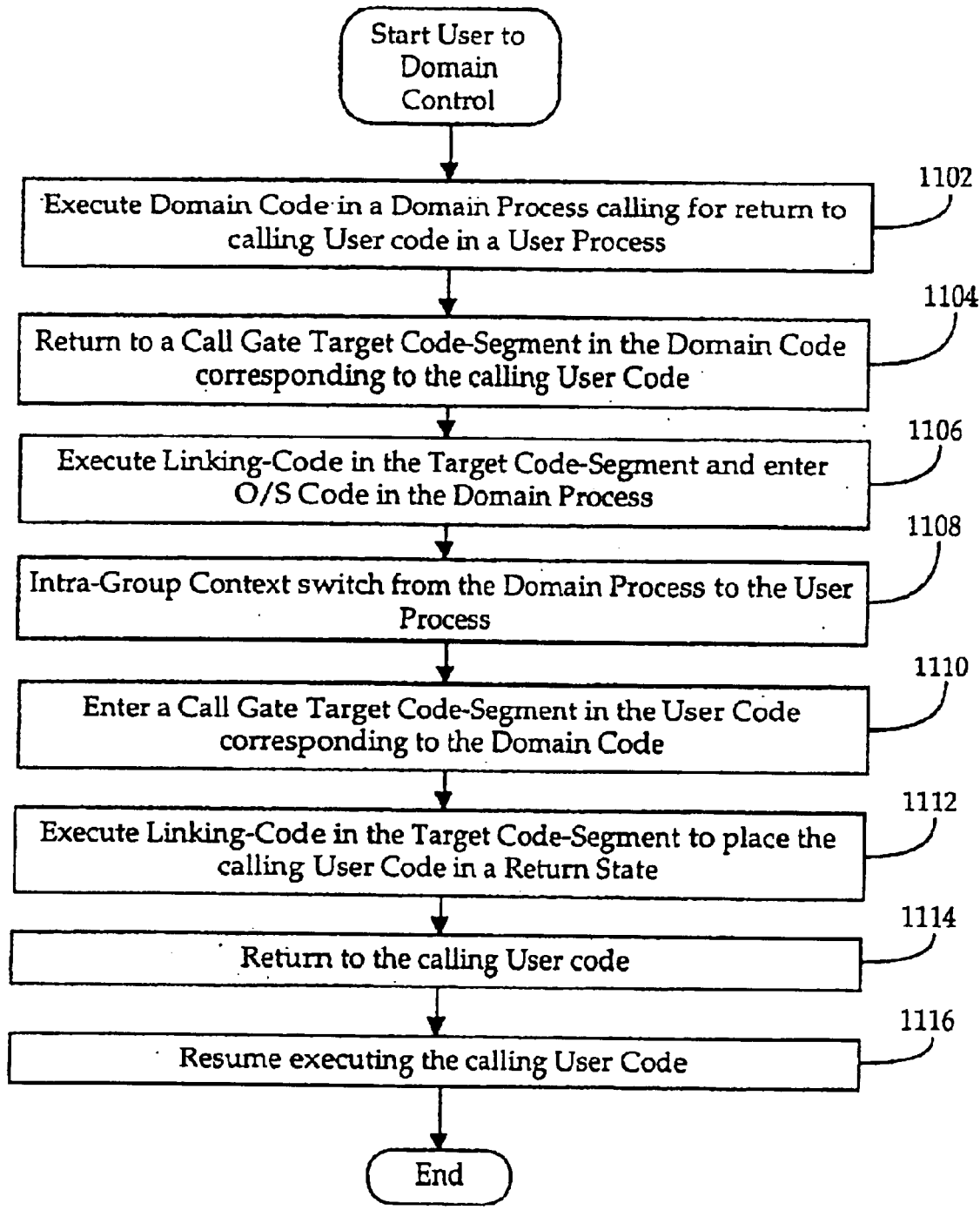
FIG. 11 is a flowchart for the program flow diagram of FIG. 10.

FIG. 10 is a program flow diagram for a user process 104 to domain process 102 control transfer return within process group 100. FIG. 11 is a flowchart for the program flow diagram of FIG. 10. FIGS. 10 and 11 are two different representations of the same process and so will be discussed simultaneously. The user-to-domain control transfer return begins in step 1102 as the program counter 106 references an instruction, as shown by line 1002, in the domain code 110 within a domain process 102, commanding return to calling user code 112 within a user process 104. In this control transfer return, the user code 112 is still the calling-code and the domain code 110' is still the target. Next in step 1104, program control returns, as shown by lines 1004 from the targeted domain code 110 to the call gate 814 target code-segment corresponding to the calling user code 112. At this time any return arguments 704 are also passed to the call gate 814. In step 1106, the linking-code 606 in the target code-segment is executed and program control is transferred to, as shown by line 1006, the operating system 108 in the domain process 102. The operating system 108 then performs an intra-group context switch, as shown by line 1008, from the domain process 102 to the user process 104 in step 1108. In step 1110, program control is transferred to, as shown by line 1010, the call gate 806 target code-segment in the user code 112, corresponding to the domain code 110. Next in step 1112, the linking-code 606 in the call gate 806 places the calling user code 112 in the calling-code return state 608. The return state is the state which the user code 112 was in before the user code 112 made the user-to-domain control transfer described in FIGS. 8 and 9. In step 1114 the linking-code 606 causes program control to return, as shown by line 1012, to the calling user code 112. The calling user code 112 then resumes execution in step 1116. After step 1116, the user-to-domain control transfer return is complete.

Figure 12:
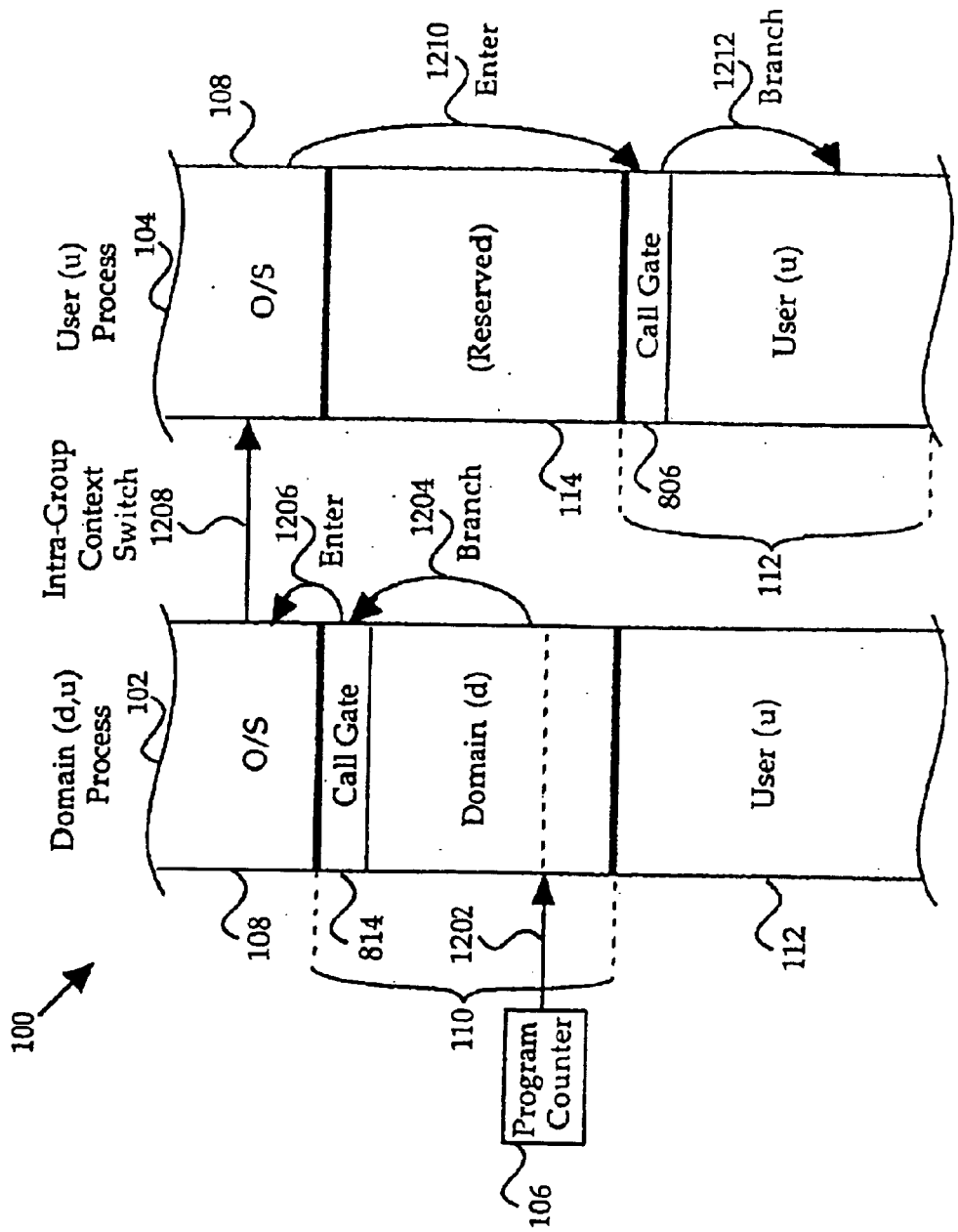
FIG. 12 is a program flow diagram for a domain process to user process control transfer.
Figure 13:
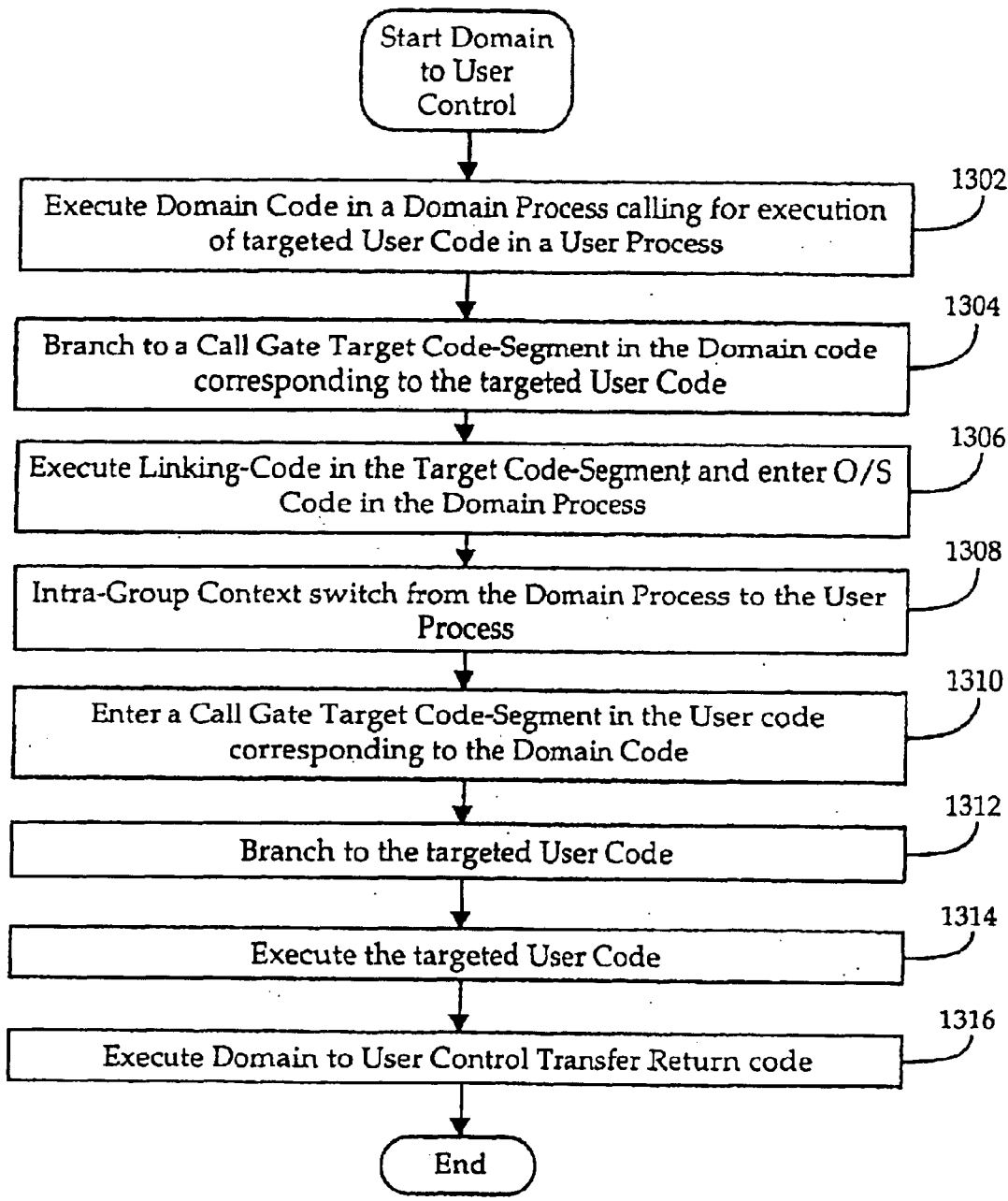
FIG. 13 is a flowchart for the program flow diagram of FIG. 12.

FIG. 12 is a program flow diagram for a domain process 102 to user process 104 control transfer within process group 100. FIG. 13 is a flowchart for the program flow diagram of FIG. 12. FIGS. 12 and 13 are two different representations of the same process and so will be discussed simultaneously. The domain-to-user control transfer begins in step 1302 as the program counter 106 references an instruction, as shown by line 1202, in the domain code 110 within a domain process 102, calling for execution of targeted user code 112, within a user process 104. In this control transfer, the domain code 110 is the calling-code and the user code 112 is the target. Next in step 1304, the calling domain code 110 identifies a set of arguments 704 and a target code-segment identifier 702 before causing program control to branch, as shown by line 1204, from the domain code 110 to a call gate 814 target code-segment, specified by the target code-segment identifier 702. In step 1306, the linking-code 606 in the target code-segment is executed and program control is transferred to, as shown by line 1206, the operating system 108 in the domain process 102. The linking-code 606 instructs the operating system 108 to both route program control to the code specified by the target code-segment identifier 702 and to pass the arguments 704 to the target. The operating system 108 then performs an intra-group context switch, as shown by line 1208, from the domain process 102 to the user process 104 in step 1308. If the intra-group context switch, as shown by line 1208, required a connection across a network (not shown) the IDL description of arguments 604 would also have been passed to the operating system 108 in the user process 104. In step 1310, program control is transferred to, as shown by line 1210, a call gate 806 target code-segment corresponding to the domain code 110. Next in step 1312, the linking-code 606 in the call gate 806 causes program control to branch, as shown by line 1212, to the targeted user code 112. Alternatively, program control may have directly entered the targeted user code since the operating system 108 has direct access privileges to all user and domain code. After step 1212, the user code 112 then executes the targeted user code in step 1314. Next in step 1316 after the user code 112 has finished executing, the linking-code 606 in the call gate 806 executes a domain-to-user control transfer return. The domain-to-user control transfer return is further described with respect to FIGS. 14 and 15. After step 1316, the domain-to-user control transfer is complete.

In contrast to the control transfers that the user code 112 is permitted to make, the domain code 110 can access user code, or same level domain code, in any process group. For example, domain (d) code 110 may access user (u) code 112, user (u+1) code, user (u+2) code, and so on. Level I domain (d) code 110 may also access other level I domain codes, such as domain (d) code 110, domain (d+1) code, domain (d+2) code, and so on. When the domain code 110 access either a user code or a domain code that is not within the currently active process group, then the operating system 108 simply makes a context switch to a process group containing the code to be accessed.

Figure 14:
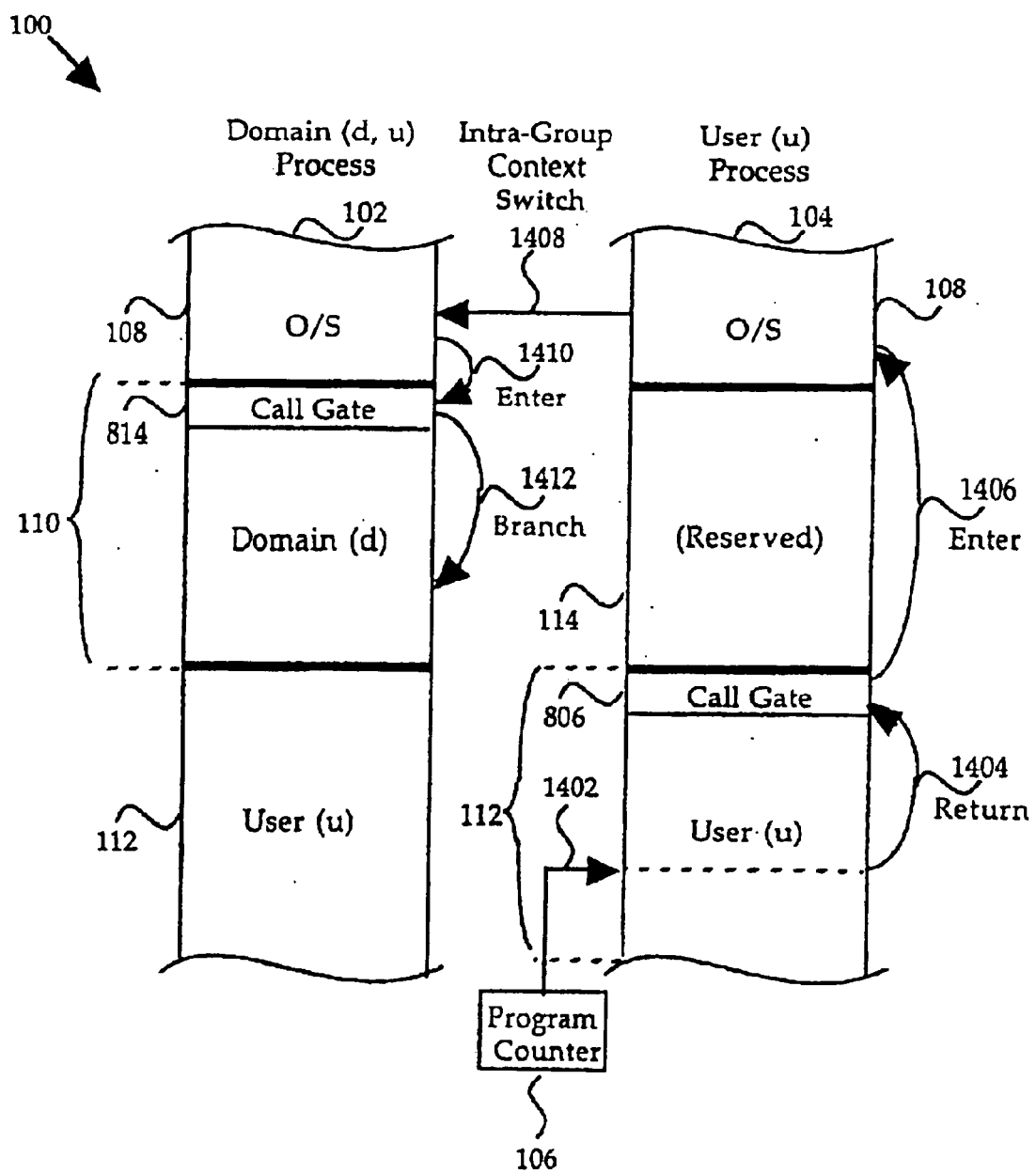
FIG. 14 is a program flow diagram for a domain process to user process control transfer return.
Figure 15:
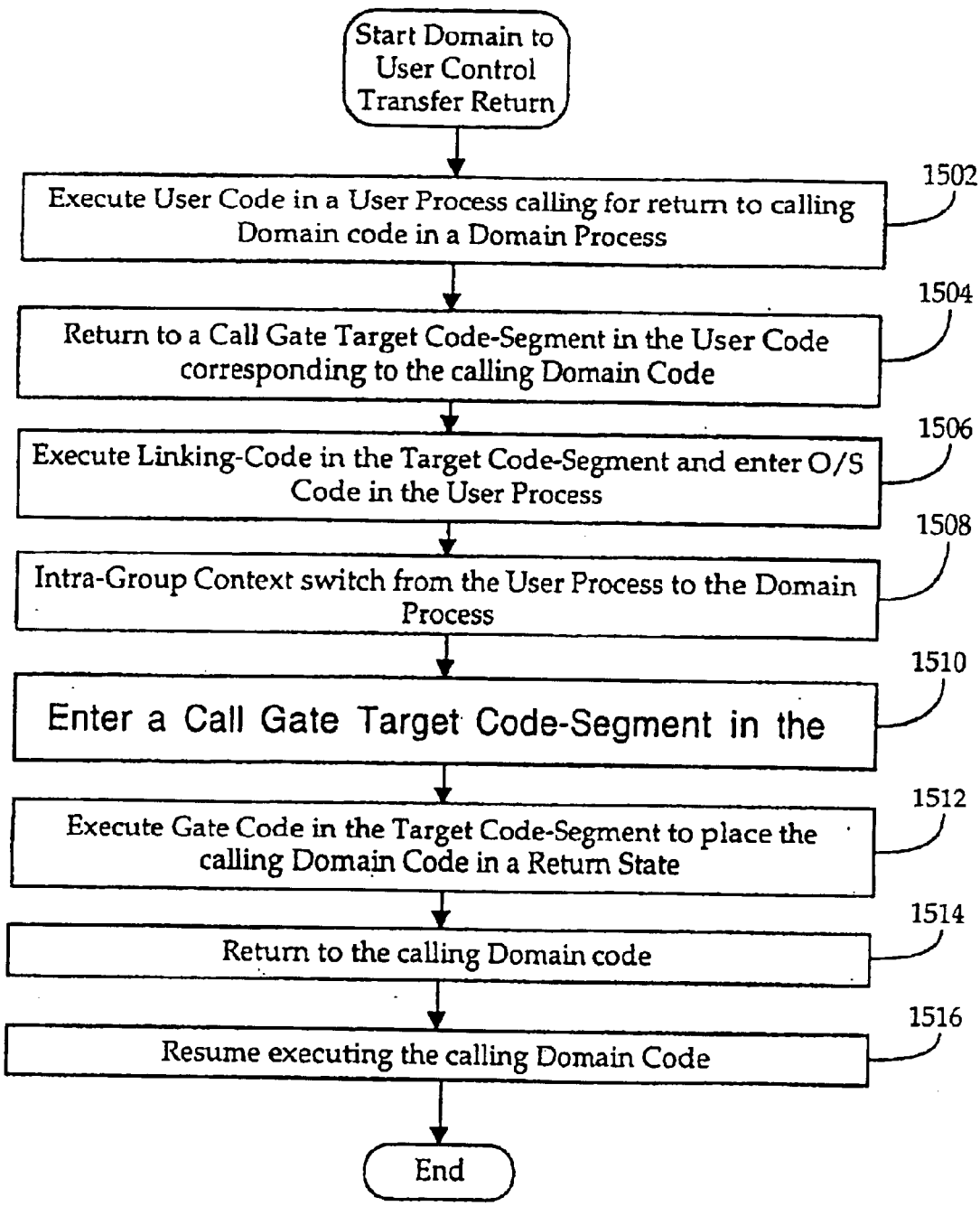
FIG. 15 is a flowchart for the program flow diagram of FIG. 14.

FIG. 14 is a program flow diagram for a domain process 102 to user process 104 control transfer return, within process group 100. FIG. 15 is a flowchart for the program flow diagram of FIG. 14. FIGS. 14 and 15 are two different representations of the same process and so will be discussed simultaneously. The domain-to-user control transfer return begins in step 1502 as the program counter 106 references an instruction, as shown by line 1402, in the user code 112 within a user process 104, commanding return to calling domain code 110 within a domain process 102. In this control transfer return, the domain code 110 is still the calling-code and the user code 112 is still the target. Next in step 1504, program control returns, as shown by line 1404 from the targeted user code 112 to the call gate 806 target code-segment corresponding to the calling domain code 110. At this time any return arguments 704 are also passed to the call gate 806. In step 1506, the linking-code 606 in target code-segment is executed and program control is transferred to, as shown by line 1406 the operating system 108 in the user process 104. The operating system 108 then performs an intra-group context switch, as shown by line 1408, from the user process 104 to the domain process 102 in step 1508. In step 1510, program control is transferred to, as shown by line 1410 the call gate 814 target code-segment in the domain code 110, corresponding to the user code 112. Next in step 1512, the linking-code 606 in the call gate 814 places the calling domain code 110 in the calling-code return state 608. The return state is the state which the domain code 110 was in before the domain code 110 made the domain-to-user control transfer described in FIGS. 12 and 13. In step 1514 the linking-code 606 causes program control to return, as shown by line 1412, to the calling domain code 110. The calling domain code 110 then resumes execution in step 1516. After step 1516, the domain-to-user control transfer return is complete.

Figure 16:
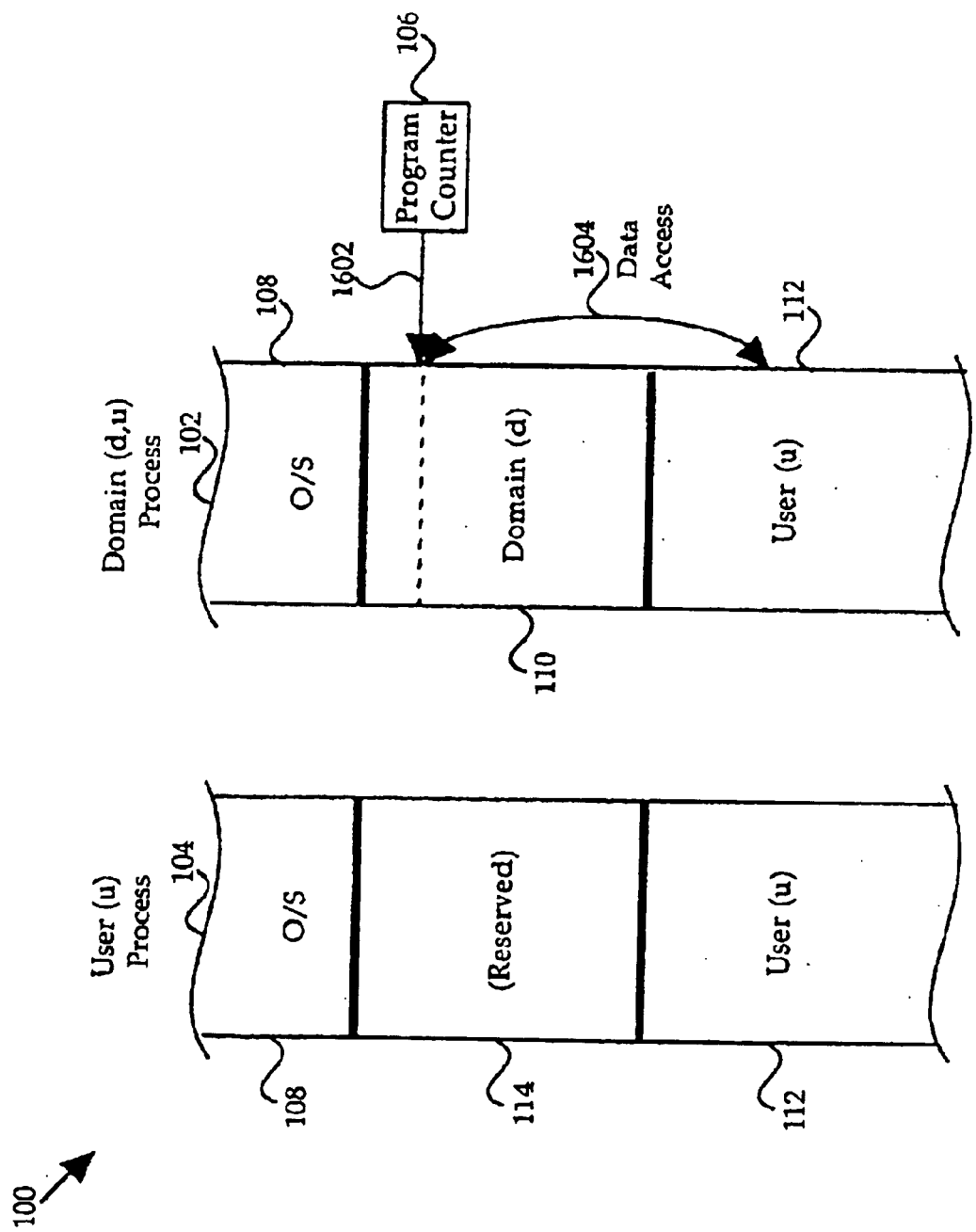
FIG. 16 is a program flow diagram for a domain process to user process data access.
Figure 17:
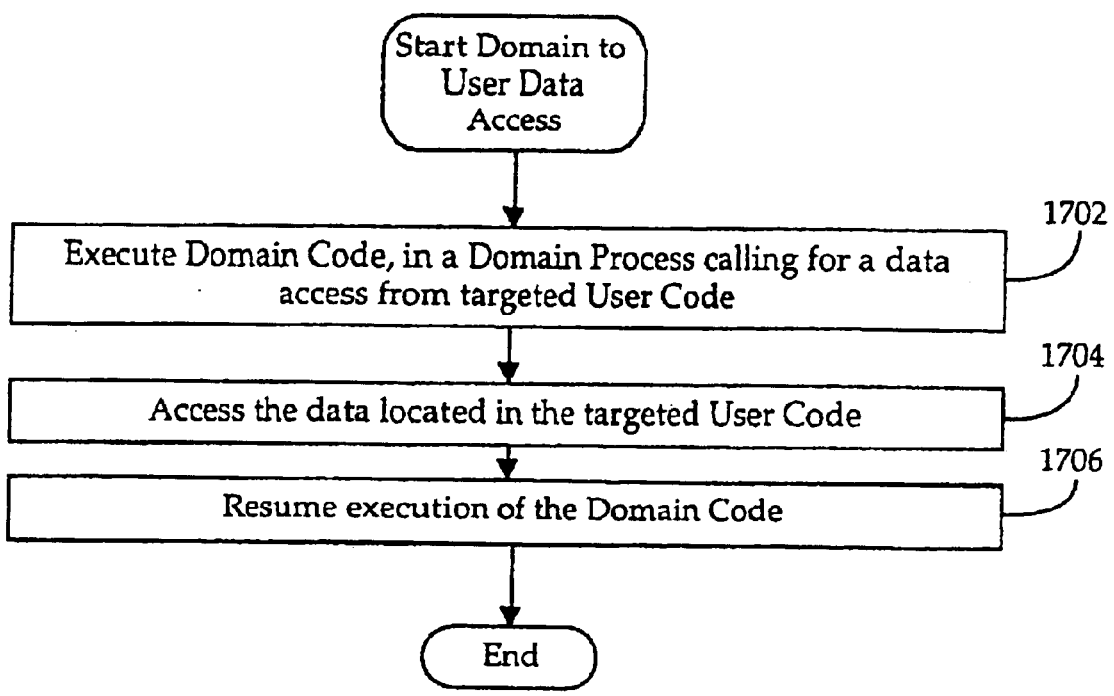
FIG. 17 is a flowchart for the program flow diagram of FIG. 16.

FIG. 16 is a program flow diagram for a domain process 102 to user process 104 data access within-process group 100. FIG. 17 is a flowchart for the program flow diagram of FIG. 16. FIGS. 16 and 17 are two different representations of the same process and so will be discussed simultaneously. The domain-to-user data access begins in step 1702 as the program counter 106 references an instruction, as shown by line 1602, in the domain code 110 within a domain process 102, calling for a data access from the targeted user data 112. In this control transfer, the domain code 110 is the calling-code and the user data 112 is the target. Next in step 1704, the domain code 110 directly accesses, as shown by line 1604, the data located in the user data 112. No call gates are used. Program control remains with the domain code 110 during the whole data access operation. In step 1706, the domain code 110 resumes execution. After step 1706, the domain-to-user data access is complete. Data access privileges are the same as for the control transfer privileges discussed above, with the exception that user code may not access domain data. Thus, the domain code 110 can access user code, or same level domain code, in any process group, but the user code may not access data in either the domain code or the operating system code even within the user code's own process group.

If a domain code is executing within a process group that does not contain a desired user code or data, an inter-group context switch to a process group containing the desired user code or data is required, before performing either a control transfer or data access operation. An inter-group context switch will now be discussed.

Figure 18:
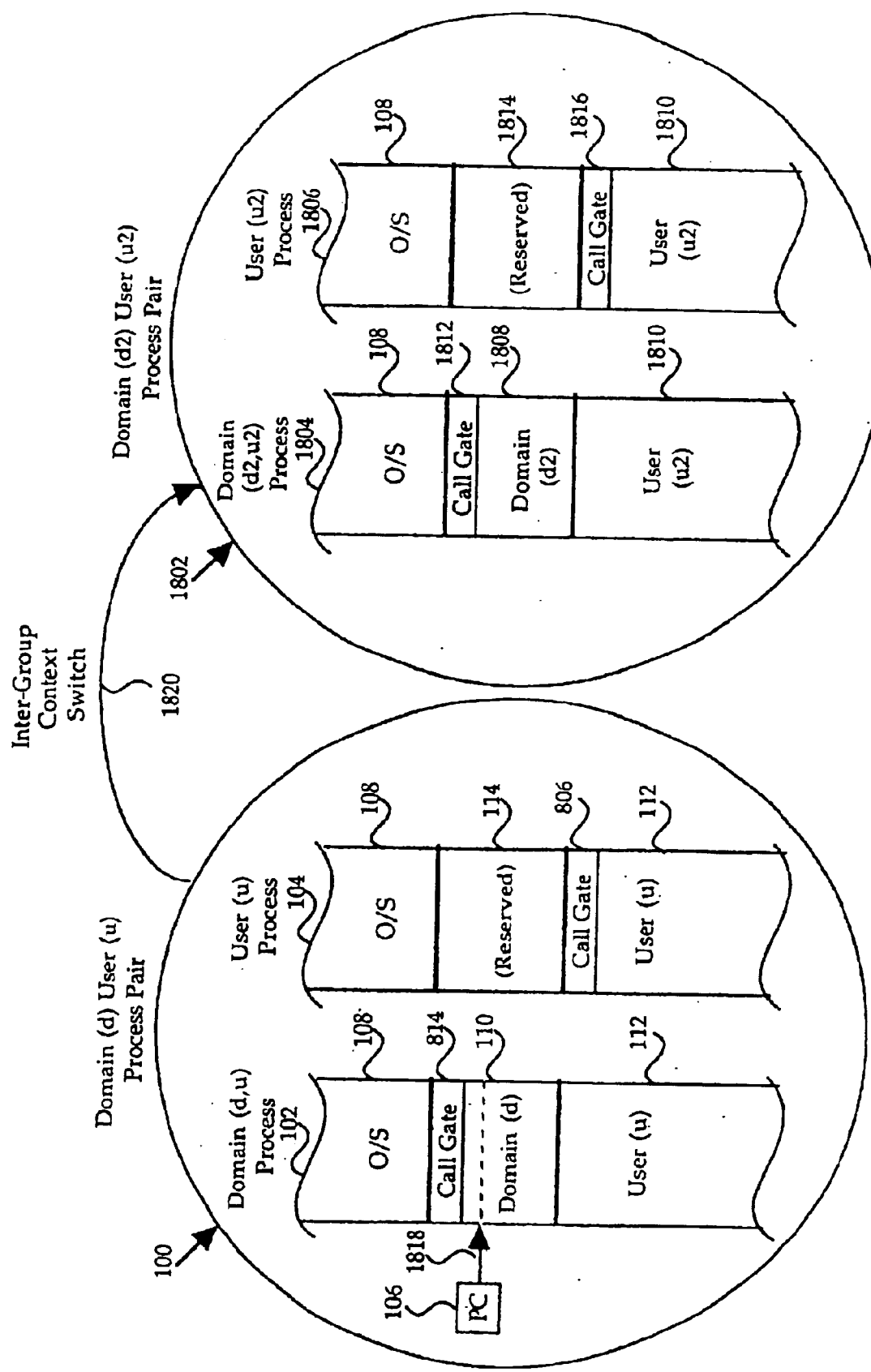
FIG. 18 is a program flow diagram for an inter-group context switch.

FIG. 18 is a program flow diagram for an inter-group context switch between process group 100 and a second process group 1802. The second process group 1802 implements three levels of memory domain protections and bears similar characteristics to the process group 100 discussed above. The second process group 1802 includes a domain ($d_2, u_2$) process 1804, and a user ($u_2$) process 1806. The domain ($d_2, u_2$) process 1804 includes the operating system 108, a domain ($d_2$) code 1808, and a user ($i_2$) code 1810. The user ($u_2$) process 1806 includes the it; operating system 108, a reserved area 1814, and the user ($u_2$) code 1810. Notice that the same operating system 108 is present in all process groups 100, 1802. The variables $d_2$ and $u_2$ represent different sets of domain code and user code that are supported by the same operating system 108.

The following discussion is to be interpreted in light of the previous discussion of FIGS. 8 through 17. The key difference between the discussion to follow and the previous discussion is that an inter-group context switch 1820 occurred instead of the intra-group context switches previously discussed. Other than this difference, the code and data access steps remain the same and so are not repeated here.

Figure 19:
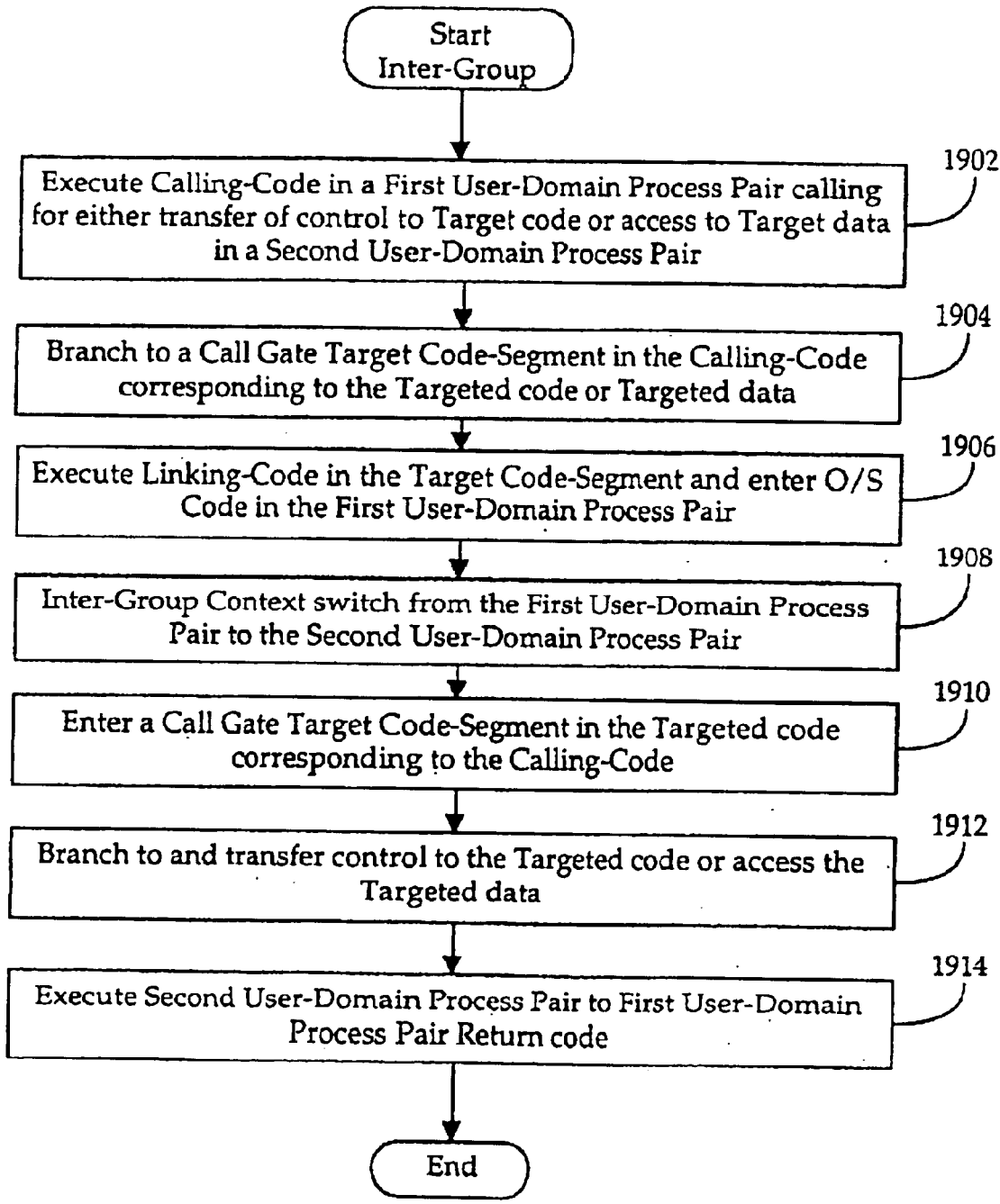
FIG. 19 is a flowchart for the program flow diagram of FIG. 18.

FIG. 19 is a flowchart for the program flow diagram of FIG. 18. FIGS. 18 and 19 are two different representations of the same process and so will now be discussed simultaneously. The process group context switch begins in step 1902 as the program counter 106 references an instruction, as shown by line 1818, executing the calling-code (i.e. the domain code 110 within the domain process 102) in process group 100 calling for either execution of the target's code or access to the target's data in the second process group 1802. As discussed above, only the domain code 110 can be the calling-code, since the user code 112 cannot cause an inter-group context switch in other words, domain-to-user control transfer and it data access instructions may result in an inter-group context switch, but user-to-domain control transfer instructions may only result in an intra-group context switch. Next in step 1904, the calling-code instructions program control to branch to the call gate 814 target code-segment corresponding to either the targeted code or the targeted data. The linking-code 606 in the target code-segment then instructs the program control to enter the operating system 108, in step 1906. In step 1908, the operating system 108 performs an inter-group context switch, as shown by line 1820, from the process group 100 to the second process group 1802. Next in step 1910, the operating system 108 cause the program flow to enter a call gate 1812 or 1816 target code-segment in the target (i.e. either the domain ($d_2$) code 1808 or the user ($u_2$) code 1810) corresponding to the calling-code. Program control then branches to the target and executes either the targeted code or access the targeted data, in step 1912. In step 1914, after program control has returned to the call gate 1812 or 1816, the linking-code 606 in the call gate executes a second process group 1802 to process group 100 return in a similar manner to other returns described above, except that another inter-group context switch must be performed.

While the present invention has been described with reference to a preferred embodiment, those skilled in the art will recognize that various modifications may be made. Variations upon and modifications to the preferred embodiment are provided by the present invention, which is limited only by the following claims.

What is claimed is:

1. A computer-implemented method for multi-level memory domain protection, comprising the steps of:

creating a domain process context, having an operating system code executing within a first protection level, a domain code executing within a second protection level, and a user code residing within the second protection level;

creating a user process context, having the operating system code executing within the first protection level, a non-executable reserved portion, and the user code executing within the second protection level; and protecting the domain code from the user code by locating the domain code in the non-executable reserved portion.

2. A system for multi-level memory domain protection, the system comprising:

means for creating a domain process context, having an operating system code executing within a first protection level, a domain code executing within a second protection level, and a user code residing within the second protection level;

means for creating a user process context, having the operating system code executing within the first protection level, a non-executable reserved portion, and the user code executing within the second protection level; and means for protecting the domain code from the user code by locating the domain code in the non-executable reserved portion.

3. A computer-useable medium embodying computer-readable program code for causing a computer to perform multi-level memory domain protection by performing the steps of:

creating a domain process context, having an operating system code executing within a first protection level, a domain code executing within a second protection level, and a user code residing within the second protection level;

creating a user process context, having the operating system code executing within the first protection level, a non-executable reserved portion, and the user code executing within the second protection level; and protecting the domain code from the user code by locating the domain code in the non-executable reserved portion.

4. A computer-implemented method for multi-level memory domain protection, comprising:

establishing a user process context for a user code;

establishing a domain process context for a domain code; and protecting the domain code, executing at a protection level, from the user code, executing at the protection level, by context switching between the user process context and the domain process context, wherein the user context process has a non-executable reserve portion in which the domain code is located.

5. A system for multi-level memory domain protection comprising:

a user process context for a user code;

a domain process context for a domain code; and a protection that protects the domain code, executing at a protection level, from the user code, executing at the protection level, by context switching between the user process context and the domain process context, wherein the user context process has a non-executable reserve portion in which the domain code is located.

6. A computer-readable medium embodying computer-readable program code for causing a computer to perform multi-level memory domain protection by performing the process of:

establishing a user process context for a user code;

establishing a domain process context for a domain code; and protecting the domain code, executing at a protection level, from the user code, executing at the protection level, by context switching between the user process context and the domain process context, wherein the user context process has a non-executable reserve portion in which the domain code is located.

7. A computer-implemented method for multi-level memory domain protection, comprising:

protecting a domain code, executing at a protection level, from a user code, executing at the protection level, by context switching to establish two levels of protection within said protection level.

8. A computer-implemented method for multi-level memory domain protection, comprising:

executing calling-code in a first process pair calling for execution of targeted code in a second process pair; and inter-group context switching from the first process pair to the second process pair, wherein the inter-group context switching establishes two levels of protection within said protection level.

9. A system for multi-level memory domain protection comprising:

a protection that protects a domain code, executing at a protection level, from a user code, executing at the protection level, formed by context switching to establish two levels of protection within said protection level.

10. A computer-readable medium embodying computer-readable program code for causing a computer to perform multi-level memory domain protection by performing the process of:

protecting a domain code executing at a protection level, from a user code, executing at the protection level, by context switching to establish two levels of protection within said protection level.

11. A system for multi-level memory domain protection comprising:

a protection that protects a domain code, executing at a protection level, from a user code, executing at the protection level, formed by context switching to establish two levels of protection within said protection level.

* * * * *